US006602585B2

(12) United States Patent
Graney

(10) Patent No.: US 6,602,585 B2
(45) Date of Patent: Aug. 5, 2003

(54) SHRINKABLE IRIDESCENT FILM

(75) Inventor: Daniel J. Graney, LeGrangeville, NY (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/963,239

(22) Filed: Sep. 26, 2001

(65) Prior Publication Data

US 2003/0059590 A1 Mar. 27, 2003

(51) Int. Cl.[7] .............................. B32B 7/00; B32B 7/02; B32B 31/30; G02B 5/28; G02B 27/00
(52) U.S. Cl. ..................... 428/212; 428/34.9; 428/35.9; 428/332; 428/339; 264/280; 264/288.4; 264/290.2; 359/577; 359/580; 359/582; 359/584; 359/586; 359/588; 359/589
(58) Field of Search ................................ 428/212, 34.9, 428/35.9, 332, 339; 264/280, 288.4, 290.2; 359/577, 580, 584, 586, 588, 589, 582

(56) References Cited

U.S. PATENT DOCUMENTS

| | | | |
|---|---|---|---|
| 3,647,612 A | | 3/1972 | Schrenk et al. |
| 3,759,647 A | | 9/1973 | Schrenk et al. |
| 4,101,698 A | | 7/1978 | Dunning et al. |
| 4,374,691 A | | 2/1983 | Vanden Bergh |
| 4,496,618 A | | 1/1985 | Pernicano |
| 4,548,857 A | | 10/1985 | Galante |
| 4,837,061 A | * | 6/1989 | Smits et al. ................. 283/108 |
| 5,015,318 A | * | 5/1991 | Smits et al. ................. 156/233 |
| 5,089,318 A | | 2/1992 | Shetty et al. |
| 5,104,719 A | | 4/1992 | Kamen et al. |
| 5,149,386 A | * | 9/1992 | Smits et al. ................. 156/150 |
| 5,149,578 A | * | 9/1992 | Wheatley et al. ........... 206/807 |
| 5,338,591 A | | 8/1994 | Poll |
| 5,571,557 A | | 11/1996 | De Bastiani et al. |
| 5,631,064 A | | 5/1997 | Marecki |
| 6,045,894 A | * | 4/2000 | Jonza et al. ................. 428/141 |
| 2001/0009722 A1 | * | 7/2001 | Allen et al. ................. 428/480 |
| 2001/0040800 A1 | * | 11/2001 | Carpenter et al. .......... 362/166 |
| 2002/0102393 A1 | * | 8/2002 | Graney ....................... 428/212 |

OTHER PUBLICATIONS

Abstract of Encyclopedia of Polymer Science and Engineering, vol. 7, paragraph 11, p. 81.

* cited by examiner

*Primary Examiner*—Vivian Chen
(74) *Attorney, Agent, or Firm*—Dickstein, Shapiro, Morin & Oshinsky, LLP.

(57) ABSTRACT

A shrinkable iridescent film constitutes an oriented multilayer coextruded iridescent film having at least 10 generally parallel, very thin layers of substantially uniform thickness in which the contiguous adjacent layers are of heat shrinkable thermoplastic resinous material, each of which is heat shrinkable in at least one dimension in the plane of the film, the continuous adjacent layers being substantially uniformly shrinkable so as to have refractive indexes which differ by at least 0.03. The shrinkable film is made by selecting appropriate thermoplastic resinous materials, coextruding them into a thick film and then subjecting the film to orientation below the heat set temperature of the resinous materials.

18 Claims, No Drawings

SHRINKABLE IRIDESCENT FILM

BACKGROUND OF THE INVENTION

The present invention relates to films that posses an adequate level of elastic memory activated through the application of heat energy which can be utilized in a variety of packaging applications, such as shrink labels and decorative shrink wrap. Hereinafter, such film will sometimes be referred to as "shrink film". The customary films used for this purpose are made of polyvinyl alcohol, glycol modified polyethylene terephthalate made from ethylene, glycol and cyclohexanedimethanol and terephthalic acid and polypropylene structures, depending on the degree of desired shrinkage required and the particular application. It has been possible to obtain shrinkages of up to 50 or 60%. Often the shrink film is preformed into a tube and then cut into the appropriate size for application to a container or some other object. It is frequently desirable for the film to shrink around the object in such a manner that it conforms exactly to the shape of that object.

Multilayer coextruded light reflecting films which have a narrow reflection band due to light interference are known. When that reflection band occurs in the range of visible wavelengths, the film appears iridescent. It would be desirable to employ such iridescent films as shrink film for shrink packaging applications but it has not been possible to achieve that object heretofore.

The multilayer coextruded iridescent films are composed of a plurality of generally parallel layers of transparent thermoplastic resinous material in which the contiguous adjacent layers are of diverse resinous material whose index of refraction differs by at least about 0.03. These films contain at least 10 layers, but are more usually composed of at least 35 and preferably at least about 70 layers. Commercially available films often contain between 50 and 100 repeating pairs of polymers, which generate the optical effect known as iridescence. Each of the individual layers is very thin and is usually on the order of about 30–500 nm. The quality of a iridescent multilayer coextruded film is dependent on the individual layers being, and remaining, generally parallel and of substantial uniform thickness. Deviations from these requirements interfere with the desired optical effect.

The traditional multilayer coextruded iridescent films possessed a minor degree of elastic memory and will shrink somewhat when exposed to heat. However, the amount of shrinkage of which these films are capable is not sufficient for use of the films for shrink packaging applications and is also accompanied by changes in the optical characteristics of the individual layers so that the iridescence is altered or lost and/or the interlayer bonds between joining layers are disturbed leading to internal delamination or separation of the layers.

Efforts have been made in the past to improve the mechanical properties of the multilayer coextruded light reflecting films, although not for the purpose of achieving a shrink film. U.S. Pat. No. 4,310,584 describes the use of thermoplastic terephthalate polyester or copolyester resins as one component of the two adjacent polymer films and another improvement is described in U.S. Pat. No. 5,089,318 in which a thermoplastic elastomer is employed as one of the resinous material. Despite these improvements, the films still have inadequate mechanical and optical properties for shrink packaging applications when compared to conventional film structures.

It is now been discovered that by appropriately selecting the different thermoplastic resinous materials and by orienting the coextruded film made from the selected materials, a shrinkable iridescent film having acceptable properties can be achieved.

It is accordingly the object of the present invention to provide a shrinkable iridescent film suitable for shrink packaging application. This and other objects of the invention will become apparent to those of ordinary skill in the art of the following detailed description.

SUMMARY OF THE INVENTION

This invention relates to a shrinkable iridescent film suitable for shrink packaging applications and to the method for the production of that film. More particularly, a shrinkable iridescent multilayered coextruded film composed of at least 10 generally parallel, very thin layers of substantially uniform thickness with the contiguous adjacent layers being of different heat shrinkable thermoplastic resinous materials, each of the materials being heat shrinkable at least one dimension in an amount of at least 10% in response to applied heat, the coextruded contiguous adjacent layers being substantially uniformly shrinkable in response to applied heat so as to have refractive indices which differ by at least about 0.03 after the shrinkage to produce an optical effect. The film is made by selecting the appropriate thermoplastic resinous materials, coextruding them into a relatively thick film, followed by orientating the film at a temperature using temperature profiles to achieve the desired color and shrink properties.

DESCRIPTION OF THE INVENTION

In accordance with the present invention, a shrinkable iridescent multilayer coextruded film is produced by varying the conventional production process with respect to the selection of the resinous materials employed, the thickness of the film coextruded, and by imparting elastic memory to the film by orientation.

Multilayer coextruded iridescent film per se is known in the art. It is described in U.S. Pat. No. Re 31,780 to Cooper, Shetty and Pinksy and U.S. Pat. Nos. 5,089,318 and 5,451,449, both to Shetty and Cooper, all of which are incorporated herein by reference, and in other patents. The iridescent film is, as there described, a transparent thermoplastic resinous coextruded laminated film of at least 10 very thin layers, preferably at least about 35 layers and more preferably at least about 70 layers, each of which is usually in the range of about 30–500 nm and more preferably about 50–400 nm, with the layers being generally parallel and the contiguous adjacent layers being of different transparent thermoplastic resinous materials differing in refractive index by at least about 0.03, and more preferably, at least about 0.06. The outermost layers of the film constituting a skin, when present, are each at least about 5% of the total thickness of the film.

The thermoplastic resinous materials used in the present invention are required to meet several characteristics. First, when formed into a thin film having a thickness of about 12–150 μm, preferably about 15–75 μm, the film must be heat-shrinkable in one or more of the dimensions lying in the plane of the film in an amount of at least 10%, preferably at least about 20%, and more preferably about 40–50%, in response to the application of heat of about 70–300° C. Preferably, the resinous material as a film is heat shrinkable in all directions in the plane of the film in a degree which is substantially the same throughout. Second, the resinous materials must also, when formed into contiguous adjacent film layers, shrink at a rate which is substantially uniform throughout the layers. The rate of shrinkage in different dimensions in the plane of the film need not be the same, but the rate for any given dimension should be substantially the same for both contiguous layers. For example, the longitudinal shrinkage can be different than the transverse shrinkage as long as both longitudinal shrinkage rates and both transverse shrinkage rates are substantially the same. Finally, the resinous materials must be selected such that the refractive indices after shrinking differ by at least about 0.03, and preferably at least about 0.06. The refractive indexes need not differ by these values before orientation because orientation can alter the index of refraction of a given layer and therefore orientation of two layers whose indices differ by less than 0.03 before orientation can result in a difference which exceeds 0.03 after orientation. In most instances, the difference in indices of refraction after orientation but before shrinkage and that after shrinkage will be approximately the same.

Any of the thermoplastic resinous material used to prepare iridescent film heretofore can be used in the present invention as long as the individual materials have the characteristics set forth above and likewise, the combination of selected resinous materials has the characteristics detailed above. Typical non-limiting examples of usable combinations include polystyrene and ethylene vinyl acetate, polystyrene and polyethylene, PETG-copolyester (a glycol modified polyethylene terephthalate made from ethylene glycol and cyclohexamedimethanol) and acrylic, and PETG-polyester and ethylene vinyl acetate.

The selected resinous materials are made into a multilayer film using convention technology modified such that each ply of the film is thicker in order to allow for thickness reduction during orientation. For example, the films can be made by a chill-roll casting technique using a conventional single manifold flat film die in combination with a feedblock which collects the melts from each of two or more extruders and arranges them into the desired layer pattern. Suitable feedblocks are described, for instance, in U.S. Pat. No. 3,565,985 and 3,773,882. The feedblocks can be used to form alternating layers of either two components (i.e. ABAB . . . ); three components (ABCABCA . . . or ACBACBC . . . ) or more. The very narrow multilayer stream flows through a single manifold flat film die where the layers are simultaneously spread to the width of the die and thinned to the final die exit thickness. The number of layers and their thickness distribution can be changed by inserting a different feedblock module. Usually, the outermost layer or layers on each side of the sheet are thicker than the other layers. The thicker skin may consist of one the components which makes up the optical core or may be a different polymer which is utilized to impart desirable mechanical, heat-sealing or other properties.

Any conventional process of orientation of films can be employed in the process of the present invention as long as the substantially uniform thickness and parallel orientation of the layers is maintained. The orientation may be uniaxial or multiaxial. For example, the film can be stretched by tension applied in the required direction and the stretching may occur between a cooling roll and a take-up unit, with the tension applied by draw rolls or a combination of draw rolls.

Another process which can be used to affect orientation is compression rolling. Here, the multilayer film is passed between rollers positioned so as to decrease the thickness to about 20–50% of the original multilayer film thickness. A lubricant is used on the film as it passes through the nip between the two rolls, and this can be applied directly to the film or to the roller surface so that it is transferred to the surface of the film as it passes between the rollers. The lubricant can be any liquid or material which acts as a liquid in the area where the pressure from the rolls is applied to the film. It acts to form a full or partial fluid film between the roll and the film so that the roll surface and the film surface are separated by the liquid lubricant thereby preventing contact and increasing mobility as the laminate enters a nip. Water can be used as a lubricant and it is also desirable to include a surfactant within the water.

During orientation, the film being oriented is usually heated to a temperature which is below the crystalline melting point of the resinous materials by roll contact and/or air. The processing temperature will depend on the particular iridescent sheet being oriented and can range from about ambient up to about 145° C. or more. Orientation imparts elastic memory to the resinous film so that it will shrink upon application of heat. Heat setting, or constrained high-temperature annealing, is required to regulate the activation range of the particular iridescent shrink film. If the heat set temperature of the resinous materials is exceeded, the film of that material will not shrink as desired.

Various examples are given below in order to illustrate the present invention. In those examples, as throughout this specification and claims, all parts and percentages are by weight, and all temperatures in ° C. unless otherwise specified.

EXAMPLE 1

Polystyrene and ethylene vinyl acetate were selected for use as the thermoplastic resinous materials. The resinous materials were coextruded to prepare a film sample with an optical core containing approximately 100 alternating layers in dimensions suitable for subsequent stretch orientation to a pre-determined thickness. The surface layer in the sample was a polyolefin. The coextruded film was produced in thicknesses ranging from 35 to 70 μm and exhibited virtually no reflected color.

The colorless extruded film was then processed using a two stage Marshall-Williams equipment and stretched at various orientation temperatures ranging from 110–115° C. The effective draw ratios varied from 1.8 to 2.6:1 and a predetermined ultimate gauge within the range of 12 to 25 μm was employed. Iridescence developed as a result of the orientation. Color measurements were taken across the web to determine the uniformity of the iridescent color which had developed. There was no indication of non-uniform draw of the individual microlayers in the plane perpendicular to the moving web.

A sample of the oriented multilayer film wrapped around a glass bottle was exposed to a hot air stream at a temperature of 200° C. for 5 seconds. Uniform iridescence was observed in the film even though it shrank by about 15% in the orientation direction, conforming to the contour of the glass bottle. Similar results were obtained by placing the glass bottle in an oven at 225° C. for 5 minutes.

EXAMPLE 2

Co-polyester and polymethylmethacryate were coextruded to prepare a film sample with an optical core containing approximately 200 alternating layers in dimensions suitable for subsequent stretch orientation to a pre-determined thickness. The surface layer in the sample was copolyester. The coextruded film was produced in thicknesses ranging from 40 to 120 μm and exhibited virtually no reflected color. The colorless extruded film was then processed using a single stage Marshal-Williams MDO and stretched at various orientation temperatures ranging from 80–125° C. The effective draw ratios varied from 1.8 to 3.5:1 and a predetermined ultimate gauge within the range of 25 to 40 μm was employed. Iridescence developed as a result of the orientation. Color measurements were taken across the web to determine the uniformity of the iridescent color which had developed. There was no indication of non-uniform draw of the individual microlayers in the plane perpendicular to the moving web.

A sample of the oriented multilayer film wrapped around a glass bottle was exposed to a hot air stream at a temperature of 200° C. for 5 seconds. Uniform iridescence was observed in the film even though it shrank by about 25% in the orientation direction, conforming to the contour of the glass bottle. Similar results were obtained by placing the glass bottle in an oven at 225° C. for 5 minutes and 175° C. for 3 minutes.

EXAMPLE 3

Example 2 is repeated except that the co-polyester is coextruded with ethylene-vinyl acetate copolymer to prepare a film having about 100 and 200 layers in the optical core and a thickness of the total film of between 75 to 100 μm. The film is processed via biaxial orientation in stretch ratios ranging from 2:1 up to 5:1 or more. The resulting films possesses iridescent properties which are retained when exposed to thermal energy which induces shrinkage between 15–50%.

EXAMPLE 4

Example 3 is repeated except that the coextruded film has about 200 layers in the optical core and a thickness of the total film of between 125 to 300 μm.

Various changes and modifications can be made in the process and products of this invention without departing from the spirit and scope thereof. For example, incorporation of dyes, pigments and processing aids into any of the polymer streams is an obvious extension of the targeted optical effects. Ultimate film thickness prior to shrink can be adjusted to virtually any practical film or sheet dimension. The film could also be surface coated or laminated to another material. The various embodiments which have been disclosed herein for the purpose of illustrating the invention only and were not intended to limit it.

What is claimed is:

1. An oriented multilayer co-extruded iridescent film having a thickness of about 12 to 150 μm, said film comprising at least 10 very thin layers of substantially uniform thickness of about 30–500 nm each, said layers being generally parallel and the contiguous adjacent layers being of different heat shrinkable thermoplastic resinous materials, each of said thermoplastic resinous materials being heat shrinkable in at least one dimension in the plane of the film in an amount of at least 10% in response to applied heat in the range of about 70–300° C., and wherein the co-extruded contiguous adjacent layers of different heat shrinkable thermoplastic resinous materials are substantially uniformly shrinkable in response to the applied heat in said range and have refractive indexes which differ by at least about 0.03 after said shrinkage and result in iridescence.

2. An oriented multilayer co-extruded iridescent film according to claim 1, wherein said film comprises at least 35 very thin layers of substantially uniform thickness, and each of said thermoplastic resinous materials is heat shrinkable in at least one dimension in the plane of the film in an amount of at least 20% in response to applied heat in the range of about 70–300° C.

3. An oriented multilayer co-extruded iridescent film according to claim 2, wherein said thermoplastic resinous materials have refractive indexes which differ by at least about 0.06 after said shrinkage.

4. An oriented multilayer co-extruded iridescent film according to claim 3, wherein said film comprises at least 70 very thin layers of substantially uniform thickness, and each of said thermoplastic resinous materials is heat shrinkable in at least one dimension in the plane of the film in an amount of about 40–50% in response to applied heat in the range of about 70–300° C.

5. An oriented multilayer co-extruded iridescent film according to claim 4, wherein said film has a thickness of about 15 to 75 μm.

6. An oriented multilayer co-extruded iridescent film according to claim 1, wherein said thermoplastic resinous materials have refractive indexes which differ by at least about 0.06 after said shrinkage.

7. An oriented multilayer co-extruded iridescent film according to claim 1, wherein said film comprises at least 70 very thin layers of substantially uniform thickness, and each of said thermoplastic resinous materials is heat shrinkable in at least one dimension in the plane of the film in an amount of about 40–50% in response to applied heat in the range of about 70–300° C.

8. An oriented multilayer co-extruded iridescent film according to claim 7, wherein said film has a thickness of about 15 to 75 μm.

9. An oriented multilayer co-extruded iridescent film according to claim 1, wherein said film has a thickness of about 15 to 75 μm.

10. A method of making an oriented multilayer co-extruded iridescent film which comprises selecting a pair of thermoplastic resinous materials, each of which when formed into an oriented thin film having a thickness of about 12–150 μm, are heat shrinkable in at least one dimension in the plan of the film in an amount of at least 10% in response to applied heat in the range of about 70–300° C., and the pair of which are substantially uniformly shrinkable in response to the applied heat in said range to have refractive indexes which differ by at least about 0.03 after said shrinkage; coextruding said pair of materials into a film having a thickness of about 24 to 750 μm to form a film comprising at least 10 generally parallel, very thin layers of substantially uniform thickness of about 30–500 nm each and in which the contiguous adjacent layers are of different heat shrinkable thermoplastic resinous materials; and imparting heat shrinkability by orienting said film having a thickness of about 24 to 750 μm while reducing the film thickness to about 12 to 150 μm.

11. A method of making an oriented multilayer co-extruded iridescent film according to claim 10, wherein said pair of thermoplastic resinous materials are selected are heat shrinkable in at least one dimension in the plane of the film in an amount of at least 20% in response to applied heat in the range of about 70–300° C., and the pair are coextruded into a film comprising at least 35 generally parallel, very thin layers.

12. A method of making an oriented multilayer co-extruded iridescent film according to claim 11, wherein said pair of thermoplastic resinous materials are selected to have refractive indexes which differ by at least about 0.06 after said shrinkage.

13. A method of making an oriented multilayer co-extruded iridescent film according to claim 12, wherein said pair of thermoplastic resinous materials are selected are heat shrinkable in at least one dimension in the plane of the film in an amount of about 40–50% in response to applied heat in the range of about 70–300° C., and the pair are coextruded into a film comprising at least 70 generally parallel, very thin layers.

14. A method of making an oriented multilayer co-extruded iridescent film according to claim 13, wherein said coextruded film thickness is about 30 to 375 μm and is reduced to about 15 to 75 μm.

15. A method of making an oriented multilayer co-extruded iridescent film according to claim 10, wherein said pair of thermoplastic resinous materials are selected to have refractive indexes which differ by at least about 0.06 after said shrinkage.

16. A method of making an oriented multilayer co-extruded iridescent film according to claim 10, wherein said pair of thermoplastic resinous materials are selected are heat shrinkable in at least one dimension in the plane of the film in an amount of about 40–50% in response to applied heat in the range of about 70–300° C., and the pair are coextruded into a film comprising at least 70 generally parallel, very thin layers.

17. A method of making an oriented multilayer co-extruded iridescent film according to claim 16, wherein said coextruded film thickness is about 30 to 375 μm and is reduced to about 15 to 75 μm.

18. A method of making an oriented multilayer co-extruded iridescent film according to claim 10, wherein said coextruded film thickness is about 30 to 375 μm and is reduced to about 15 to 75 μm.

* * * * *